(12) United States Patent
Dehmel et al.

(10) Patent No.: US 9,079,469 B2
(45) Date of Patent: Jul. 14, 2015

(54) AIR SPRING AND DAMPER UNIT WITH HEIGHT ADJUSTMENT

(71) Applicant: Ford Global Technologies, LLC, Dearborn, MI (US)

(72) Inventors: Matthias Dehmel, Pulheim (DE); Michael Johannes Frantzen, Aachen (DE); Michael Seemann, Cologne (DE); Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/944,873

(22) Filed: Jul. 17, 2013

(65) Prior Publication Data

US 2014/0049013 A1 Feb. 20, 2014

(30) Foreign Application Priority Data

Aug. 16, 2012 (DE) .......... 10 2012 214 569

(51) Int. Cl.
| | |
|---|---|
| B60G 17/044 | (2006.01) |
| B60G 15/12 | (2006.01) |
| B60G 17/015 | (2006.01) |
| B60G 11/27 | (2006.01) |
| B60G 15/10 | (2006.01) |
| B60G 11/14 | (2006.01) |
| B60G 17/08 | (2006.01) |
| B60G 17/056 | (2006.01) |
| F16F 9/04 | (2006.01) |

(52) U.S. Cl.
CPC ............ *B60G 17/0155* (2013.01); *B60G 11/14* (2013.01); *B60G 11/27* (2013.01); *B60G 15/10* (2013.01); *B60G 17/044* (2013.01); *B60G 17/0565* (2013.01); *B60G 17/08* (2013.01); *F16F 9/0472* (2013.01); *B60G 2202/12* (2013.01); *B60G 2202/152* (2013.01); *B60G 2500/30* (2013.01)

(58) Field of Classification Search
CPC ..... B60G 17/0155; B60G 17/44; B60G 15/12
USPC .......... 280/5.5, 5.514, 5.515, 6.157, 124.157, 280/124.158, 124.159; 267/64.17, 64.19, 267/64.21
See application file for complete search history.

(56) References Cited

U.S. PATENT DOCUMENTS

| | | | | |
|---|---|---|---|---|
| 2,874,957 | A * | 2/1959 | Davis ......................... | 267/64.19 |
| 5,217,210 | A * | 6/1993 | Schutzner .................. | 267/64.16 |
| 5,476,161 | A * | 12/1995 | Tang et al. ................. | 188/266.5 |
| 5,564,680 | A * | 10/1996 | Sano et al. ................. | 267/64.17 |

(Continued)

*Primary Examiner* — Ruth Ilan
*Assistant Examiner* — Barry Gooden, Jr.
(74) *Attorney, Agent, or Firm* — LeClairRyan

(57) ABSTRACT

A vehicle suspension apparatus includes various elements, such as a self-pumping air spring and damper unit operating with compressed air for height adjustment of a vehicle body relative to a wheel suspension of a vehicle. The apparatus further includes at least one spring space filled with compressed air, which is at least partially bounded by at least one movable wall and a damper cylinder, which can be connected to the spring space for fluid transmission by at least one connecting valve. The damper cylinder includes a working space divided by a piston, which moves inside the working space, and fluidly connected by a throttle valve. The connecting valve and the throttle valve are each switchable valves, and one of the working spaces of the damper cylinder can be vented to the surrounding atmosphere via at least one switchable vent valve.

8 Claims, 2 Drawing Sheets

(56) References Cited

U.S. PATENT DOCUMENTS

| | | | | |
|---|---|---|---|---|
| 5,669,597 | A * | 9/1997 | Rittstieg et al. | 267/64.17 |
| 5,941,508 | A * | 8/1999 | Murata et al. | 267/64.17 |
| 5,996,980 | A * | 12/1999 | Frey et al. | 267/64.27 |
| 6,494,442 | B2 * | 12/2002 | Beck et al. | 267/64.17 |
| 6,547,224 | B2 * | 4/2003 | Jensen et al. | 267/64.17 |
| 6,553,761 | B2 * | 4/2003 | Beck | 60/477 |
| 6,871,845 | B2 * | 3/2005 | Beck | 267/64.17 |
| 7,364,142 | B2 * | 4/2008 | Beck | 267/64.17 |
| 7,635,051 | B2 * | 12/2009 | Beck | 188/322.2 |
| 8,100,236 | B2 * | 1/2012 | Jung et al. | 188/297 |
| 8,215,620 | B2 * | 7/2012 | Krauss | 267/64.17 |
| 8,511,652 | B2 * | 8/2013 | Moulik et al. | 267/64.21 |
| 8,561,767 | B2 * | 10/2013 | Jung et al. | 188/297 |
| 8,567,575 | B2 * | 10/2013 | Jung et al. | 188/297 |
| 8,641,052 | B2 * | 2/2014 | Kondo et al. | 280/5.514 |
| 2001/0005065 | A1 * | 6/2001 | Beck et al. | 267/64.16 |
| 2001/0032462 | A1 * | 10/2001 | Beck | 60/477 |
| 2002/0148692 | A1 * | 10/2002 | Jensen et al. | 188/313 |
| 2004/0130079 | A1 * | 7/2004 | Gold et al. | 267/64.23 |
| 2004/0165953 | A1 * | 8/2004 | Greppmair | 404/133.05 |
| 2006/0207846 | A1 * | 9/2006 | Krauss | 188/314 |
| 2007/0120300 | A1 * | 5/2007 | Achenbach | 267/64.17 |
| 2007/0126163 | A1 * | 6/2007 | Leonard et al. | 267/64.27 |
| 2008/0290571 | A1 * | 11/2008 | Krauss | 267/124 |
| 2009/0236807 | A1 * | 9/2009 | Wootten et al. | 280/5.514 |
| 2010/0065994 | A1 * | 3/2010 | Krauss | 267/64.17 |
| 2010/0066051 | A1 * | 3/2010 | Haugen | 280/124.157 |
| 2011/0115139 | A1 * | 5/2011 | Moulik et al. | 267/64.23 |
| 2011/0115140 | A1 * | 5/2011 | Moulik et al. | 267/64.23 |
| 2012/0187640 | A1 * | 7/2012 | Kondo et al. | 280/5.514 |

* cited by examiner

AIR SPRING AND DAMPER UNIT WITH HEIGHT ADJUSTMENT

TECHNICAL FIELD

The present invention relates to an air spring and damper unit for height adjustment of the vehicle body in accordance with the preamble of claim 1.

BACKGROUND OF THE INVENTION

Motor vehicles with wheel suspension systems which contain an active or semiactive level or height control system for the vehicle body offer various advantages in comparison with vehicles that have a passive wheel suspension system. A constant ground clearance allows an improvement in handling since the compression and rebound movements of the wheels are independent of the loading of the vehicle. It is likewise possible, for example, to raise the vehicle body relative to the underlying surface in urban driving, i.e. at a low driving speed, and thus to increase ground clearance in order, for example, to be able to drive over speed bumps, curbs or underground car park entries with a high ramp angle without problems. At higher driving speeds, the vehicle body can be lowered with the aid of the level control system in order, for example, to reduce the air resistance of the vehicle. In the case of vehicles, in particular passenger vehicles, the movements of the vehicle body are usually damped predominantly by hydraulic means, e.g. by means of a hydraulic oil. As an alternative, however, it is also possible to use air as a working medium to produce damping forces, this having advantages for the environment inter alia in comparison with the use of hydraulic oil. Moreover, the level control systems for vehicles which are commercially available at present are relatively expensive and have a high weight. In addition, they need a large amount of installation space and require a relatively large amount of energy for operation.

Thus, DE 10 2006 055 757 A1, for example, discloses a self-pumping air spring and damper unit operating with compressed air and including automatic level control for vehicle chassis, having a pump which is driven by the variation in the distance between the articulation points of the spring and damper unit on a vehicle body and a chassis caused by the compression and rebound of the vehicle and which produces an increase in the compressed air, as a result of which the air spring and damper unit maintains a defined level in the case of variable loading of the vehicle. The pump is formed essentially of two pump components, which can move relative to one another and which reduce a compression space, of which one pump component is connected to one articulation point and the other pump component is connected to the other articulation point in such a way that the variation in the distance between the articulation points during the compression and rebound of the vehicle is transferred to the distance between the pump components. The spring and damper unit furthermore has two working spaces which can be connected by a throttle valve that allows throughflow and which contain a damping medium that is exchanged between the working spaces, with damping by the throttle valves, during the compression and rebound of the vehicle. One of the working spaces is bounded by a rolling bellows, which rolls on the contour of a rotationally symmetrical rolling cylinder. The compression space of the pump can be connected to one of the working spaces for fluid transmission by a check valve, with the result that, during a compression stroke of the pump or during compression, air is pumped into one working space by the pump. During rebound, air is discharged from the working space via a discharge device that is also provided, which essentially has a discharge cylinder and a discharge piston. The pump and the discharge device are matched to one another in such a way that a constant vehicle height is always obtained, irrespective of the loading of the vehicle, through compression and rebound movements of the vehicle body.

DE 10 2005 060 581 A1 furthermore discloses an air spring and damper unit for vehicles which, as working spaces, has two pressure spaces filled with compressed air and connected to one another by flow channels and has movable walls in the form of rolling or concertina bellows. The compressed air is pumped into the working spaces by a compressor via associated valves and lines, and can likewise be discharged via this system. In one direction of flow, a throttle valve with controllable damping is arranged in a first flow channel and is designed as a pilot-controlled main valve which opens toward the low-pressure side and, on the low-pressure side, can be supplied with a control pressure. The air spring and damper unit disclosed is not capable of performing a self-pumping height adjustment.

DE 43 34 007 A1 discloses a pneumatic spring/damper unit which comprises a cylinder divided by a piston with a piston rod arranged on one side into two pneumatic chambers, the volumes of which change in opposite senses during piston strokes. Moreover, a further pneumatic chamber is provided between components on the piston rod and the adjacent end of the cylinder, the pneumatic chamber being closed by a rolling bellows and normally communicating with one of the two pneumatic chambers via connecting channels in the piston rod. The two pneumatic chambers can be connected to one another via valve-controlled transfer channels provided in the piston. The damper action can be varied by controlling the throttling resistances of the transfer channels. However, DE 43 34 007 A1 does not disclose height adjustment.

DE 44 18 120 A1 describes a pneumatic spring/damper unit very similar to that in DE 43 34 997 A1, in which the valves in the transfer channels can be controlled in accordance with the stroke velocity and/or the stroke travel of the spring strokes in order to be able to vary both the spring stiffness and the damper action.

DE 42 38 790 A1 furthermore discloses an air spring unit having a main chamber, the volume of which can vary during spring strokes, and an additional chamber, which has a substantially constant volume and can be connected to the main chamber or separated therefrom by a switchable valve, thus allowing the progressivity of the spring means to be varied by opening or closing the valve. However, the air spring unit described cannot perform height adjustment or damping.

DE 31 06 122 A1 furthermore describes a height adjustment system for motorcycles in which, with increasing driving speed, compressed air is pumped out of a high-pressure gas source, which is fed by an air pump driven by means of an electric motor, in each case by means of switchable solenoid valves, into a pneumatic shock damper mechanism of a front and rear telescopic suspension in order to raise the chassis of the motor vehicle. As the driving speed decreases, the telescopic suspension systems are vented to atmosphere by means of solenoid vent valves, thus allowing compressed air contained in the shock damper mechanisms to escape. As a result, the chassis of the motor vehicle is lowered.

DE 2 016 540 discloses a springing system for motor vehicles having a mechanical level control system that has a coil spring as a main spring, a gas spring connected in parallel therewith as an additional spring, and a level controller. The level controller is set up in such a way that, when the vehicle is subjected to a load greater than the normal load, the air spring is connected to an excess pressure source and, when the vehicle is subjected to a load lower than the normal load, is connected to a vacuum source. Setting of a vehicle height independent of the loading of the vehicle is thereby achieved.

DE 609723 describes a springing and damping device for vehicles which consists essentially of a metal coil spring and an air spring connected in parallel therewith. The air spring is formed by an air spring cylinder which comprises an outer cylinder, the wall of which is penetrated by bores which allow air to pass inward and outward, and an inner cylinder, which is inserted into the outer cylinder and the wall of which contains machined air passage and throttling bores on both sides of a piston considered to be in the central position and machined air transfer channels on the outer surface. The springing and damping device described is not capable of performing level control.

SUMMARY OF THE INVENTION

Given this background, it is the object of the present invention to specify a particularly advantageous embodiment of a pneumatic air spring and damper unit for height adjustment of a vehicle body. This air spring and damper unit should be of particularly compact construction and, at the same time, should be capable of providing a height adjustment function for a vehicle body, an air spring function and a pneumatic damper function. Moreover, the operation of the air spring and damper unit should be possible with as little as possible externally supplied energy.

This object is achieved by an air spring and damper unit for height adjustment of a vehicle body having the features of claim 1. Further particularly advantageous embodiments of the invention are disclosed by the dependent claims.

It should be noted that the features presented individually in the following description can be combined in any technologically meaningful way and can give rise to additional embodiments of the invention. The description additionally characterizes and specifies the invention, especially when taken in conjunction with the figures.

According to the invention, a self-pumping air spring and damper unit operating with compressed air for height adjustment of a vehicle body relative to a wheel suspension of a vehicle, in particular a motor vehicle, which can be articulated to the vehicle body by means of a first articulation point and to the wheel suspension by means of a second articulation point, comprises at least one spring space filled with compressed air, which is at least partially bounded by at least one movable wall and which supports the two articulation points in a sprung manner relative to one another, and one damper cylinder, which can be connected to the spring space for fluid transmission by at least one connecting valve, is connected to one of the two articulation points and has at least two working spaces, which can be connected for fluid transmission by at least one throttle valve that allows throughflow and which are separated by a working piston that can be moved in the damper cylinder and is connected to the other of the two articulation points by a piston rod. According to the present invention, the connecting valve and the throttle valve are each switchable, in particular electrically switchable, valves, and one of the working spaces of the damper cylinder can be vented to the surrounding atmosphere via at least one switchable, in particular electrically switchable, vent valve. This design allows a space-saving, compact combination of three functions in a single unit: height adjustment of the vehicle body relative to the wheel suspension, air springing and air damping.

Thus, when the throttle valve and/or the vent valve are fully open and the connecting valve is closed, for example, the air spring and damper unit according to the invention can be operated purely as an air spring. Owing to the fact that the connecting valve is closed, it is not possible for compressed air to escape out of the spring space bounded by the movable wall and filled with compressed air, which supports the first articulation point, attached to the vehicle body, and the second articulation point, attached to the wheel suspension of the vehicle, of the air spring and damper unit according to the invention in a sprung manner relative to one another, into the damper cylinder or into one of the working spaces thereof and, conversely, it is likewise impossible for air to pass out of one of the working spaces of the damper cylinder, through the closed connecting valve, into the spring space. Owing to the fact that the throttle valve is open and/or the vent valve which vents one of the working spaces to the surrounding atmosphere is open, it is not possible for the damper cylinder to develop a damper action with the working piston that can be moved or displaced therein and divides the damper cylinder into the two working spaces.

Operation of the air spring and damper unit according to the invention as an air spring with a simultaneous damping action is achieved if the throttle valve is at least partially opened in such a way that energy of the air flowing through the throttle valve during compression and rebound owing to the movement of the working piston in the damper cylinder is dissipated. In this operating mode of the air spring and damper unit, the connecting valve and the vent valve are switched to the closed position. The air spring and damper unit according to the invention can thus simultaneously provide both spring and damper forces.

Operation as a semiactive, i.e. self-pumping, height adjustment device, in which the air spring and damper unit according to the invention provides not only spring forces but also a height adjustment function, is achievable by switching the throttle valve to the closed position and switching the connecting valve between the damper cylinder and the spring space and the vent valve for venting one of the two working spaces of the damper cylinder to the surrounding atmosphere in accordance with the instantaneous direction of movement, i.e. the compression or rebound movement, of the air spring and damper unit as described below.

To raise the vehicle body relative to the wheel suspension of the vehicle, i.e. to increase the distance between the first articulation point of the air spring and damper unit, that attached to the vehicle body, and the second articulation point of the air spring and damper unit, that attached to the wheel suspension, the connecting valve is switched to the closed position during the rebound movement, i.e. when the distance between the two articulation points is increasing, while the vent valve is switched to an at least partially open position. Consequently, air is drawn into the damper cylinder from the surrounding atmosphere since the damper cylinder is connected to one of the two articulation points and the working piston is connected via the piston rod to the other of the two articulation points, and the distance between said two articulation points increases during a rebound. During the compression movement, i.e. when the distance between the two articulation points is decreasing, the vent valve is switched to the closed position and the connecting valve is switched to an at least partially open position, with the result that air is pumped out of the damper cylinder or one of the two working spaces that can be connected to the spring space for fluid transmission by the connecting valve into the spring space, as a result of which the air pressure in the spring space increases and the vehicle body is raised relative to the wheel suspension. Thus, it is essentially only the energy of oscillation or the dynamics of the movement of the wheel suspension which is/are used to raise the vehicle body relative to the wheel suspension of the vehicle. A supply of external energy to the air spring and damper unit according to the invention for height adjustment of the vehicle body is required only to switch the valves.

To reduce the height of the vehicle body relative to the wheel suspension of the vehicle, i.e. to reduce the distance between the first articulation point of the air spring and damper unit, that attached to the vehicle body, and the second articulation point of the air spring and damper unit, that attached to the wheel suspension, the connecting valve is switched to an at least partially open position during the rebound movement, i.e. when the distance between the two articulation points is increasing, while the vent valve is switched to the closed position. Consequently, air is drawn out of the spring space into the damper cylinder since the damper cylinder is connected to one of the two articulation points and the working piston is connected via the piston rod to the other of the two articulation points, and the distance between said two articulation points increases during a rebound. During the compression movement, i.e. when the distance between the two articulation points is decreasing, the vent valve is switched to an at least partially open position and the connecting valve is switched to a closed position, with the result that air is pumped out of the damper cylinder or one of the two working spaces that can be vented to the surrounding atmosphere via the vent valve into the surrounding atmosphere. Owing to this pumping operation, the air pressure in the spring space decreases and the vehicle body is lowered relative to the wheel suspension. Thus, it is essentially only the energy of oscillation or the dynamics of the movement of the wheel suspension which is/are used to lower the vehicle body relative to the wheel suspension of the vehicle. A supply of external energy to the air spring and damper unit according to the invention for height adjustment of the vehicle body is required only to switch the valves.

It is expedient if the damper, connecting and vent valves are switched by means of an electronic control unit in accordance with the desired one of the three above-described operating modes of the air spring and damper unit according to the invention and with the instantaneous compression or rebound movement thereof.

By means of the above-described combination of the three functions of air springing, air damping and height adjustment in one unit, it is possible to achieve significant advantages with the air spring and damper unit according to the invention, particularly in respect of the installation space required. Moreover, the operation of the semiactive height adjustment system requires only the supply of a small amount of electric energy to switch the valves and thus operates in a considerably more energy saving manner than a conventional active height adjustment system, in which the pressure increase in the spring space is brought about by means of an electrically operated compressor, for example. Moreover, the use of air instead of hydraulic oil for damping the oscillatory movement of the vehicle body offers significant advantages in terms of environmental compatibility.

One advantageous embodiment of the invention envisages that the movable wall is designed as a concertina bellows or as a rolling bellows. In the latter case, according to another advantageous embodiment of the invention, the rolling bellows rolls on an outer circumference of a rotationally symmetrical first body, designed, for example, as a rolling cylinder, connected to one of the two articulation points. By means of this embodiment it is possible to achieve comfortable springing by the air spring and damper unit according to the invention.

To further improve the springing properties of the air spring and damper unit according to the invention, another embodiment of the invention furthermore envisages that the rolling bellows rolls at least partially on an inner circumference of a rotationally symmetrical hollow second body connected to the other articulation point. Thus, the second body can, for example, be designed as a guide sleeve for the movable wall, in particular the movable wall designed as a concertina or rolling bellows, wherein the first body, e.g. a rolling cylinder, can be arranged at least partially within the second body, coaxially with the latter, this being particularly economical in terms of installation space.

Another advantageous embodiment of the invention envisages that respective spring plates are provided, which are connected to the two articulation points and between which a coil spring surrounding the air spring and damper unit is clamped. Thus, this embodiment of the air spring and damper unit according to the invention is distinguished by a metal coil spring connected in parallel with the air spring and damper unit per se. The air spring and damper unit according to this embodiment consequently forms a compact spring strut.

An embodiment of the invention which is advantageous in respect of a compact form envisages that the at least one throttle valve is arranged in the working piston of the damper cylinder.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings, which are incorporated herein by reference, and described below by way of examples of the invention wherein.

DETAILED DESCRIPTION OF THE PREFERRED EMBODIMENTS

Figure 1:
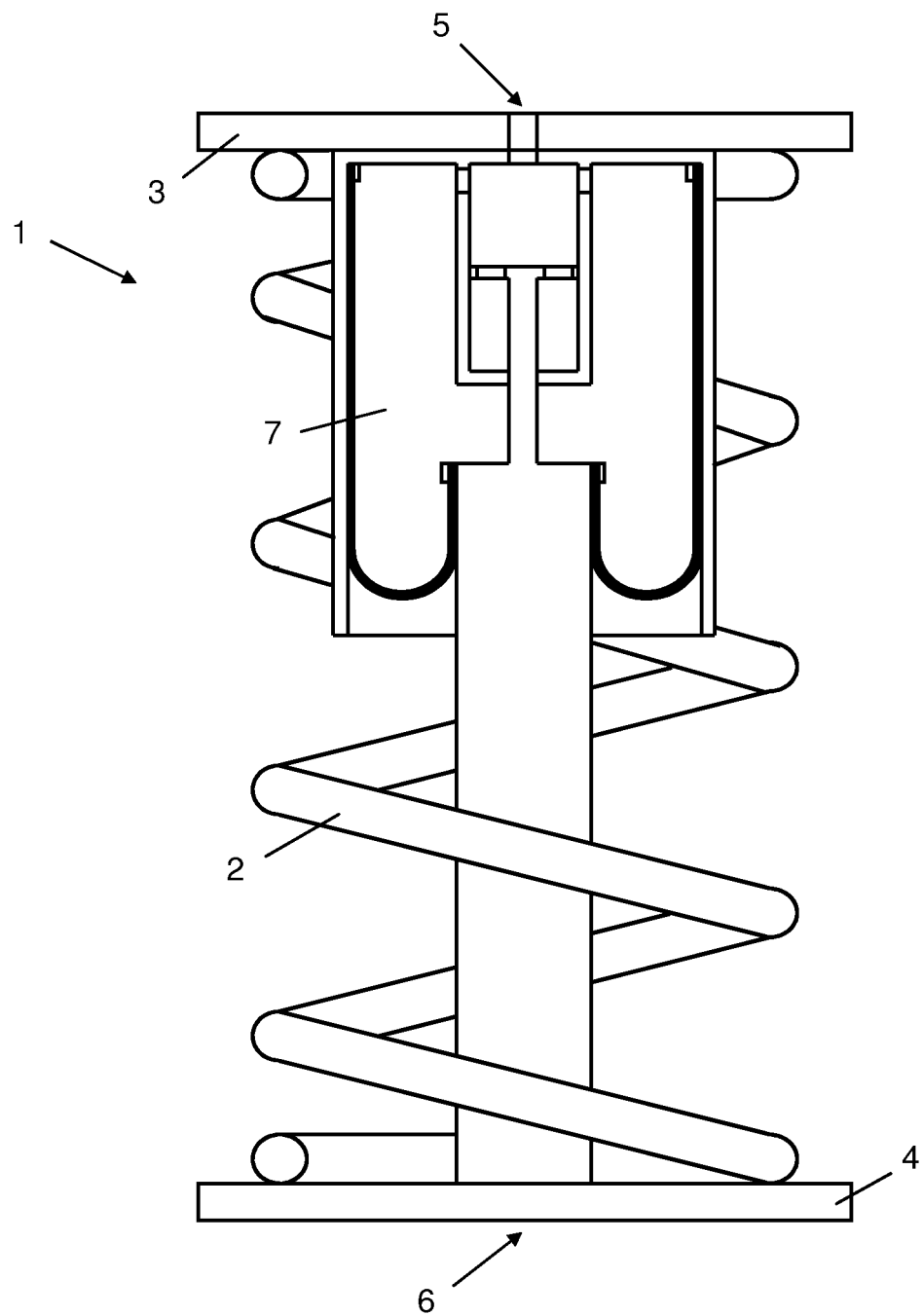
FIG. 1 shows a side view, illustrated partially in cross section, of an air spring and damper unit according to the invention.

In the attached figures the same reference numerals will be used to refer to the same components. In the following description various operating parameters and components are described for different constructed embodiments. These specific parameters and components are included as examples and are not meant to be limiting.

FIG. 1 represents a side view of an air spring and damper unit 1 according to the invention for height adjustment of a vehicle body (not shown in FIG. 1). As can be seen from FIG. 1, the device 1 comprises a coil spring 2, which has a plurality of coils. The coils describe a helix or helical line in a manner known per se. As can furthermore be seen from FIG. 1, the coil spring 2 is clamped between an upper spring plate 3 on the body side, which is connected to the vehicle body (not shown), for example, and a lower spring plate 4 on the wheel suspension side, which is connected to the wheel suspension or a wheel suspension component (likewise not shown in FIG. 1), for example. Also indicated in FIG. 1 are an upper articulation point 5 on the body side and a lower articulation point 6 on the wheel suspension side, by means of which the air spring and damper unit 1 can be articulated to the vehicle body and to the wheel suspension of the vehicle (not shown in FIG. 1). The coil spring 2 serves in a manner known per se for the sprung support, against the vehicle body, of the wheel suspension, which can be moved relative to the vehicle body.

Figure 2:
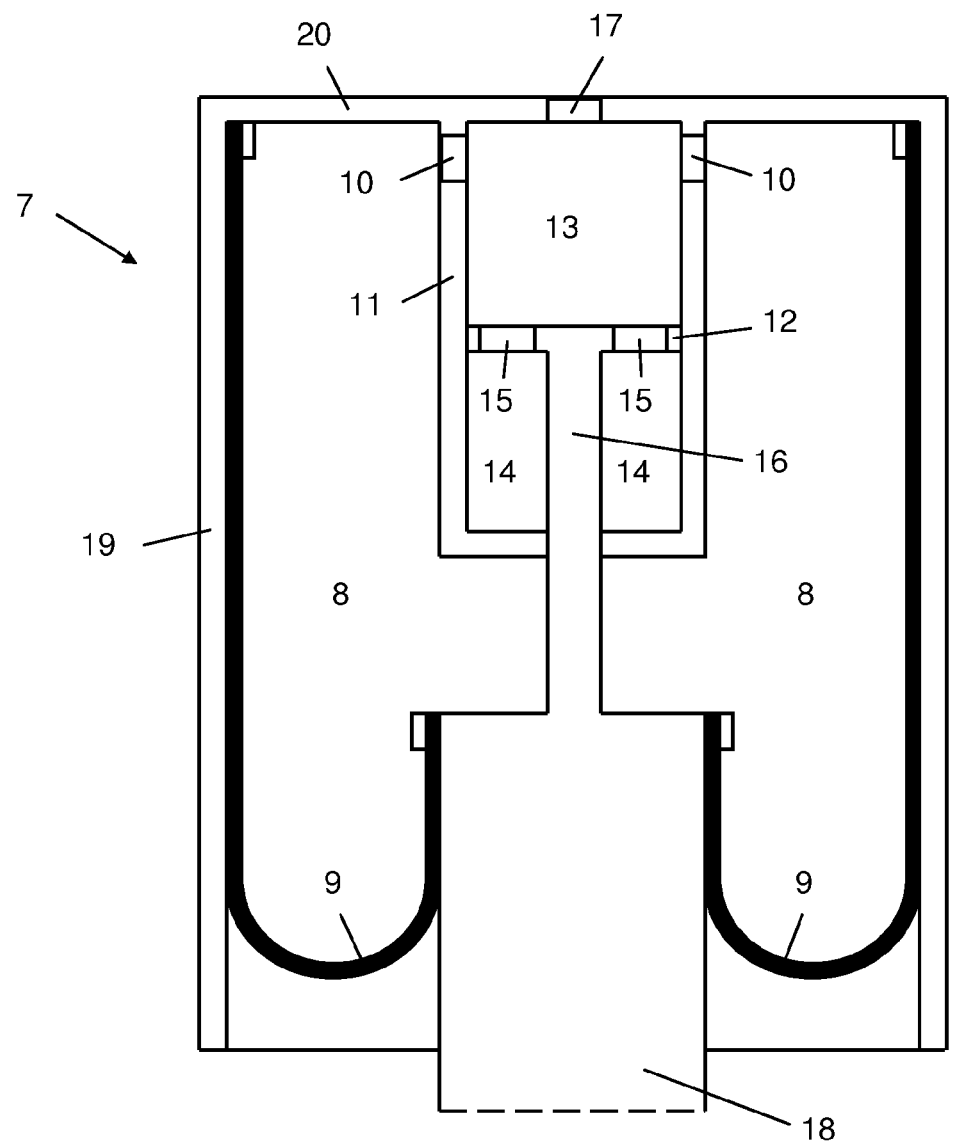
FIG. 2 shows an enlarged cross sectional side view of the air spring and damper unit illustrated in FIG. 1.

Arranged within the volume enclosed by the coil spring 2 or coils is an air spring and damper element 7 of the air spring and damper unit 1, which is shown in an enlarged cross sectional side view in FIG. 2.

As can be seen from FIG. 2, the air spring and damper unit 1 or the air spring and damper element 7 illustrated comprises a spring space 8 filled with compressed air, which is bounded by a movable wall 9 in the form of a rolling bellows. The spring space 8 supports the two articulation points 5 and 6 shown in FIG. 1 in a sprung manner relative to one another in addition to the coil spring 2.

In the illustrative embodiment shown in FIG. 2, the spring space 8 can be connected to a damper cylinder 11 for fluid transmission by two connecting valves 10. The damper cylinder 11 is connected to the upper articulation point 5 or spring plate 3, i.e. that on the body side, which is shown in FIG. 1. The damper cylinder 11 is furthermore divided into an upper working space 13 and a lower working space 14 by a working piston 12, which can be moved in the damper cylinder 11. In the illustrative embodiment of the air spring and damper unit 1 shown, it is possible, in particular, for the upper working space 13 of the damper cylinder 11 to be connected to the spring space 8 for fluid transmission by the connecting valves 10. In the illustrative embodiment shown in FIG. 2, the working spaces 13 and 14 can be connected to one another for fluid transmission by two throttle valves 15 which allow throughflow. In the illustrative embodiment shown, the throttle valves 15 are arranged in the working piston 12. As can be seen from FIGS. 1 and 2, the working piston 12 is connected to the lower articulation point 6 by a piston rod 16.

As is furthermore shown in FIG. 2, the upper working space 13 of the damper cylinder 11 can be vented to the surrounding atmosphere via a vent valve 17.

The connecting valves 10, the throttle valves 15 and the vent valve 17 are each switchable valves, and are in particular, electrically switchable valves. These are switched by means of an electronic control unit (not shown in the figures) in accordance with the desired operating mode of the air spring and damper unit 1 and in accordance with the instantaneous direction of movement, i.e., the compression or rebound movement, of the air spring and damper unit 1, as already described in the general part of the present disclosure.

Thus, with the throttle valves 15 fully open and/or the vent valve 17 fully closed and the connecting valves 10 closed, the air spring and damper unit 1 according to the invention can be operated as a pure air spring, for example. Owing to the fact that the connecting valves 10 are closed, it is not possible for compressed air to escape out of the spring space 8 bounded by the movable wall 9 and filled with compressed air, which supports the upper articulation point 5, attached to the vehicle body, and the lower articulation point 6, attached to the wheel suspension of the vehicle, of the air spring and damper unit 1 according to the invention in a sprung manner relative to one another, into the damper cylinder 11 or into the upper working space 13 and, conversely, it is likewise impossible for air to pass out of the upper working space 13 of the damper cylinder 11, through the closed connecting valves 10, into the spring space 8. Owing to the fact that the throttle valves 15 are open and/or the vent valve 17 which vents the upper working space 13 to the surrounding atmosphere is open, it is not possible for the damper cylinder 11 to develop a damper action with the working piston 12 that can be moved or displaced therein and divides the damper cylinder 11 into the two working spaces 13 and 14.

Operation of the air spring and damper unit 1 according to the invention as an air spring with a simultaneous damping action is achieved if the throttle valves 15 are at least partially opened in such a way that energy of the air flowing through the throttle valves 15 during compression and rebound owing to the movement of the working piston 12 in the damper cylinder 11 is dissipated. In this operating mode of the air spring and damper unit 1, the connecting valves 10 and the vent valve 17 are switched to the closed position. The air spring and damper unit 1 according to the invention can thus simultaneously provide both spring and damper forces.

Operation as a semiactive, i.e. self-pumping, height adjustment device, in which the air spring and damper unit 1 according to the invention provides not only spring forces but also a height adjustment function, is achievable by switching the throttle valves 15 to the closed position and switching the connecting valves 10 between the damper cylinder 11 and the spring space 8 and the vent valve 17 for venting the upper working space 13 of the damper cylinder 11 to the surrounding atmosphere in accordance with the instantaneous direction of movement, i.e. the compression or rebound movement, of the air spring and damper unit 1 as described below.

To raise the vehicle body relative to the wheel suspension of the vehicle, i.e. to increase the distance between the first articulation point 5 of the air spring and damper unit 1, that attached to the vehicle body, and the second articulation point 6 of the air spring and damper unit 1, that attached to the wheel suspension, the connecting valves 10 are switched to the closed position during the rebound movement, i.e. when the distance between the two articulation points 5 and 6 is increasing, while the vent valve 17 is switched to an at least partially open position. Consequently, air is drawn into the damper cylinder 11 or the upper working space 13 from the surrounding atmosphere since the damper cylinder 11 is connected to one 5 of the two articulation points and the working piston 12 is connected via the piston rod 16 to the other 6 of the two articulation points, and the distance between said two articulation points increases during a rebound. During the compression movement, i.e. when the distance between the two articulation points 5 and 6 is decreasing, the vent valve 17 is switched to the closed position and the connecting valves 10 are switched to an at least partially open position, with the result that air is pumped out of the damper cylinder 11 or the upper working space 13 that can be connected to the spring space 8 for fluid transmission by the connecting valve 10 into the spring space 8, as a result of which the air pressure in the spring space 8 increases and the vehicle body is raised relative to the wheel suspension. Thus, it is essentially only the energy of oscillation or the dynamics of the movement of the wheel suspension which is/are used to raise the vehicle body relative to the wheel suspension of the vehicle. A supply of external energy to the air spring and damper unit 1 according to the invention for height adjustment of the vehicle body is required only to switch the valves 10, 15 and 17.

To reduce the height of the vehicle body relative to the wheel suspension of the vehicle, i.e. to reduce the distance between the first articulation point 5 of the air spring and damper unit 1, that attached to the vehicle body, and the second articulation point 6 of the air spring and damper unit 1, that attached to the wheel suspension, the connecting valves 10 are switched to an at least partially open position during the rebound movement, i.e. when the distance between the two articulation points 5 and 6 is increasing, while the vent valve 17 is switched to the closed position. Consequently, air is drawn out of the spring space 8 into the damper cylinder 11 or the upper working space 13 since the damper cylinder 11 is connected to one 5 of the two articulation points and the working piston 12 is connected via the piston rod 16 to the other 6 of the two articulation points, and the distance between said two articulation points 5 and 6 increases during a rebound. During the compression movement, i.e. when the distance between the two articulation points 5 and 6 is decreasing, the vent valve 17 is switched to an at least partially open position and the connecting valves 10 are switched to a closed position, with the result that air is pumped out of the damper cylinder 11 or the upper working space 13 that can be vented to the surrounding atmosphere via the vent valve 17 into the surrounding atmosphere. Owing to this pumping operation, the air pressure in the spring space 8 decreases and the vehicle body is lowered relative to the wheel suspension. Thus, it is essentially only the energy of oscillation or the dynamics of the movement of the wheel suspension which is/are used to lower the vehicle body relative to the wheel suspension of the vehicle. A supply of external energy to the air spring and damper unit 1 according to the invention for height adjustment of the vehicle body is required only to switch the valves 10, 15 and 17.

For optimum spring comfort of the air spring and damper unit 1, the rolling bellows 9 rolls at least partially, as can be seen in FIG. 2, on an outer circumference of a rotationally symmetrical first body 18 connected to the lower articulation point 6 (shown in FIG. 1). In the illustrative embodiment shown in FIGS. 1 and 2, the body 18 is designed as a rotationally symmetrical rolling cylinder. Moreover, a rotationally symmetrical, hollow second body 19, which is designed as a guide sleeve in the illustrative embodiment of the air spring and damper unit 1 shown and is connected to the upper articulation point 5 (shown in FIG. 1), is provided, on the inner circumference of which the rolling bellows 9 at least partially rolls. As can be seen from FIG. 2, the guide sleeve 19 is closed at the upper end thereof by means of an end plate 20 extending substantially transversely to the longitudinal axis. The guide sleeve 19 is connected to the upper articulation point 5 by this end plate 20. As can furthermore be seen from FIG. 2, the vent valve 17 in the illustrative embodiment of the air spring and damper device 1 shown is arranged in the end plate 20. It can furthermore be seen from FIG. 2 that the first body 18 in the illustrative embodiment of the air spring and damper unit 1 shown is arranged at least partially within the second body 19, coaxially with the latter, this being particularly economical in terms of installation space.

The air spring and damper unit according to the invention which has been described above, for height adjustment of a vehicle body, is not restricted to the embodiment disclosed herein but also includes further embodiments with the same effect. In particular, the number and arrangement of the switchable connecting, throttle and vent valves is not restricted to the illustrative embodiment described herein. Thus, instead of being arranged in the working piston, the throttle valves could, for example, likewise be arranged in transfer channels provided in the cylinder wall of the damper cylinder to connect the upper working space to the lower working space for fluid transmission. Of course, just one such transfer channel connecting the working spaces of the damper cylinder could be provided. Instead of the upper working space of the damper cylinder, it would likewise be possible for the lower working space to be connected to the spring space for fluid transmission by at least one connecting valve. In this case, the at least one connecting valve, the at least one throttle valve and the at least one vent valve could be switched as follows for height adjustment of the vehicle body.

In order to raise the vehicle body relative to the wheel suspension of the vehicle, the connecting valve which connects the lower working space of the damper cylinder to the spring space for fluid transmission and the vent valve which vents the upper working space of the damper cylinder to the surrounding atmosphere are switched to an at least partially open position during the rebound movement of the air spring and damper unit according to the invention, whereas the at least one throttle valve, which is arranged in the working piston for example, is switched to the closed position. The movement of the working piston in the damper cylinder, caused by the rebound movement, from the upper working space in the direction of the lower working space leads, on the one hand, to air being sucked from the surrounding atmosphere into the upper working space and, on the other hand, to the air in the lower working space being pumped into the spring space, as a result of which the air pressure in the spring space increases and the vehicle body is raised relative to the wheel suspension of the vehicle. During the compression movement of the air spring and damper unit, at least the connecting valve is switched to the closed position and the throttle valve is switched to the open position, with the result that the lower working space of the damper cylinder can once again be filled with air from the upper working space. During this process, the vent valve can likewise be switched to the closed position.

To reduce the height of the vehicle body relative to the wheel suspension of the vehicle, the throttle valve is switched to the open position during the rebound movement of the air spring and damper unit according to the invention, while the connecting valve is switched to the closed position. In this way, the movement of the working piston in the damper cylinder from the upper working space in the direction of the lower working space allows air in the lower working space of the damper cylinder to flow into the upper working space. In this case, the vent valve can be switched to the closed position. During the compression movement of the air spring and damper unit, the connecting valve and the vent valve are now switched to the open position and the throttle valve is switched to the closed position. It is thus possible, on the one hand, for air to flow out of the spring space into the lower working space of the damper cylinder and, on the other hand, for the air in the upper working space of the damper cylinder to be pumped into the surrounding atmosphere.

In a preferred embodiment, the air spring and damper unit according to the invention is used in a vehicle, in particular a motor vehicle, for height adjustment of the vehicle body relative to the wheel suspension.

LIST OF REFERENCE SIGNS air spring and damper unit
2 coil spring
3 spring plate on the body side
4 spring plate on the wheel suspension side
5 articulation point on the body side
6 articulation point on the wheel suspension side
7 air spring and damper element
8 spring space
9 movable wall, rolling bellows
10 connecting valve
11 damper cylinder
12 working piston
13 upper working space
14 lower working space
15 throttle valve
16 piston rod 17 vent valve
18 rotationally symmetrical first body, rolling cylinder
19 rotationally symmetrical hollow second body, guide sleeve
20 end plate

The invention claimed is:

1. A vehicle suspension apparatus comprising:
a spring space partially enclosed by a movable wall and fillable with compressed air, the spring space define on one end by a first end plate; and
a damper cylinder divided into a first space and a second space by a piston, the first space connected to the spring space via a first valve and to the second space by a second valve, the damper cylinder vented to surrounding atmosphere by a third valve, which is positioned in the first end plate, wherein the piston is includes a piston rod that is operatively coupled to a second end plate by a cylinder, and wherein the movable wall is coupled to the cylinder.

2. The vehicle suspension apparatus of claim 1, wherein the first valve, the second valve, and the third valve are electronically switchable to determine a functionality of the vehicle suspension apparatus.

3. The vehicle suspension apparatus of claim 1, wherein the vehicle suspension apparatus is configured to function as an air spring when the first valve is closed to impede air from passing between the first space and the spring space, the second valve is open to allow air to pass between the first space and the second space, and the third valve is open to allow air to exit the first space.

4. The vehicle suspension apparatus of claim 1, wherein the vehicle suspension apparatus is configured to provide a dampening action when the first valve is closed to impede air from passing between the first space and the spring space, the second valve is at least partially open in a manner that at least partially dissipates air flow inside the first space and second space caused by a motion of the piston, and the third valve is closed to impede air from exiting the first space.

5. The vehicle suspension apparatus of claim 1, wherein the first valve is electronically switchable from a closed position to an open position when the piston is pumps air out of the first space to raise a body of a vehicle.

6. A vehicle suspension apparatus comprising:
spring space at least partially enclosed and fillable with compressed air; and
a damper working space in which a piston reciprocates and divides the damper working space into a lower portion and an upper portion, which is connected to the spring space by a first valve, is connected to the lower portion by a second valve, and is connected to a surrounding environment by a third valve, wherein the vehicle suspension apparatus is configured to function as an air spring when the first valve is closed to impede air from passing between the upper portion and the spring space, the second valve is open to allow air to pass between the upper portion and the lower portion, and the third valve is open to allow air to exit the upper working space.

7. The vehicle suspension apparatus of claim 6, wherein the first valve, the second valve, and the third valve are electronically switchable to determine a functionality of the vehicle suspension apparatus.

8. The vehicle suspension apparatus of claim 6, wherein the vehicle suspension apparatus is configured to provide a dampening action when the first valve is closed to impede air from passing between the upper portion and the spring space, the second valve is at least partially open in a manner that at least partially dissipates air flow inside the upper portion and lower portion caused by a motion of the piston, and the third valve is closed to impede air from exiting the upper portion.

* * * * *